United States Patent
Kusagaya

(10) Patent No.: US 7,703,954 B2
(45) Date of Patent: Apr. 27, 2010

(54) VEHICLE LAMP

(75) Inventor: Masahiro Kusagaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 249 days.

(21) Appl. No.: 11/947,403

(22) Filed: Nov. 29, 2007

(65) Prior Publication Data

US 2008/0130301 A1    Jun. 5, 2008

(30) Foreign Application Priority Data

Dec. 1, 2006    (JP)    ............................. 2006-325378

(51) Int. Cl.
 *F21V 21/28*    (2006.01)
(52) U.S. Cl. .................. 362/465; 362/466; 362/523
(58) Field of Classification Search ............... 362/515, 362/512, 528, 529, 530, 531
See application file for complete search history.

(56) References Cited

U.S. PATENT DOCUMENTS

| | | | | |
|---|---|---|---|---|
| 5,906,431 A | * | 5/1999 | Chianale et al. ............. | 362/515 |
| 7,036,964 B2 | * | 5/2006 | Takii et al. ................... | 362/465 |
| 7,175,319 B2 | * | 2/2007 | Tajima et al. ................ | 362/465 |
| 7,364,331 B2 | * | 4/2008 | Tajima ........................ | 362/509 |
| 7,387,415 B2 | * | 6/2008 | Tajima et al. ................ | 362/513 |
| 7,556,409 B2 | * | 7/2009 | Tatara et al. ................. | 362/465 |
| 2008/0106909 A1 | * | 5/2008 | Kusagaya .................... | 362/524 |
| 2008/0225543 A1 | * | 9/2008 | Kuwahara et al. ........... | 362/523 |

FOREIGN PATENT DOCUMENTS

| | | |
|---|---|---|
| JP | 2004-227933 | 8/2004 |
| JP | 2005-119463 | 5/2005 |

* cited by examiner

*Primary Examiner*—Anabel M Ton
(74) *Attorney, Agent, or Firm*—Osha • Liang LLP

(57) ABSTRACT

A vehicle lamp includes a lamp body having a front opening, a transparent cover covering the front opening to form a lamp chamber, and a lamp unit, which forwardly irradiates light, disposed in the lamp chamber. The vehicle lamp includes an aiming device having an output shaft coupled to one of an upper surface and a lower surface of the lamp unit, and a fulcrum portion coupled to the other of the upper surface and the lower surface of the lamp unit. The output shaft is movable in a front-and-rear direction with respect to the lamp body, and is rotatable around an axis extending in a vertical direction. The fulcrum portion supports the lamp unit by a single fulcrum allowing the lamp unit to be tilted in the vertical direction and in a horizontal direction.

11 Claims, 6 Drawing Sheets

VEHICLE LAMP

CROSS-REFERENCE TO RELATED APPLICATION(S)

The present application claims priority from Japanese Patent Application No. 2006-325378 filed on Dec. 1, 2006, the entire content of which is incorporated herein by reference.

BACKGROUND OF INVENTION

1. Field of the Invention

The present invention relates to a vehicle lamp. Specifically, the present invention relates to a technique for reducing the number of components in a vehicle lamp to reduce size and cost.

2. Background Art

In a vehicle lamp (e.g., a vehicle headlamp), it is necessary to adjust an irradiating direction in vertical and horizontal directions. This is required for precisely irradiating a forward area of a road on which a vehicle is traveling to ensure driving safety and for preventing dazzling light against a pedestrian or a driver of a vehicle running on an opposite lane.

Accordingly, in some vehicle lamps, a bracket is disposed inside a lamp chamber formed by a lamp body and a transparent cover such that the bracket is tiltable in the vertical and horizontal directions, and a lamp unit for irradiating light is supported on the bracket (see, e.g., JP 2004-227933 A and JP 2005-119463 A). The irradiating direction is adjusted by titling the bracket in the vertical and/or horizontal direction(s) to tilt the lamp unit.

However, because the bracket is supported on the lamp body at three points, an assembly work is onerous. Thus, there is a problem that productivity is low.

SUMMARY OF INVENTION

One or more embodiments of the invention provide a vehicle lamp in which a lamp unit is supported at one point.

According to one or more embodiments of the invention, a vehicle lamp includes a lamp body having a front opening, a transparent cover which covers the front opening, a lamp unit which forwardly irradiates light, an aiming device having an output shaft coupled to either one of an upper surface and a lower surface of the lamp unit and a fulcrum portion coupled to the other of the upper surface and the lower surface of the lamp unit. The lamp unit is disposed inside a lamp chamber formed by the lamp body and the transparent cover. The output shaft is relatively movable in a front-and-rear direction with respect to the lamp body, and is rotatable around an axis extending in a vertical direction. The fulcrum portion supports the lamp unit by a single fulcrum which allows the lamp unit to be tilted in the vertical direction and in a horizontal direction.

According to one or more embodiments of the invention, therefore, it is possible to support the lamp unit without using a bracket that is tiltable with respect to the lamp body. In addition, because the lamp unit is tiltable in the vertical direction and in the horizontal direction by a single fulcrum, the number of components is reduced. Thus, an assembling process is simplified.

Other aspects and advantages of the invention will be apparent from the following description, the drawings and the claims.

DETAILED DESCRIPTION

Hereinafter, embodiments of the invention will be explained with reference to the drawings. The following embodiments are merely examples and the scope of the invention should be limited only by the appended claims.

First Embodiment

Figure 1:
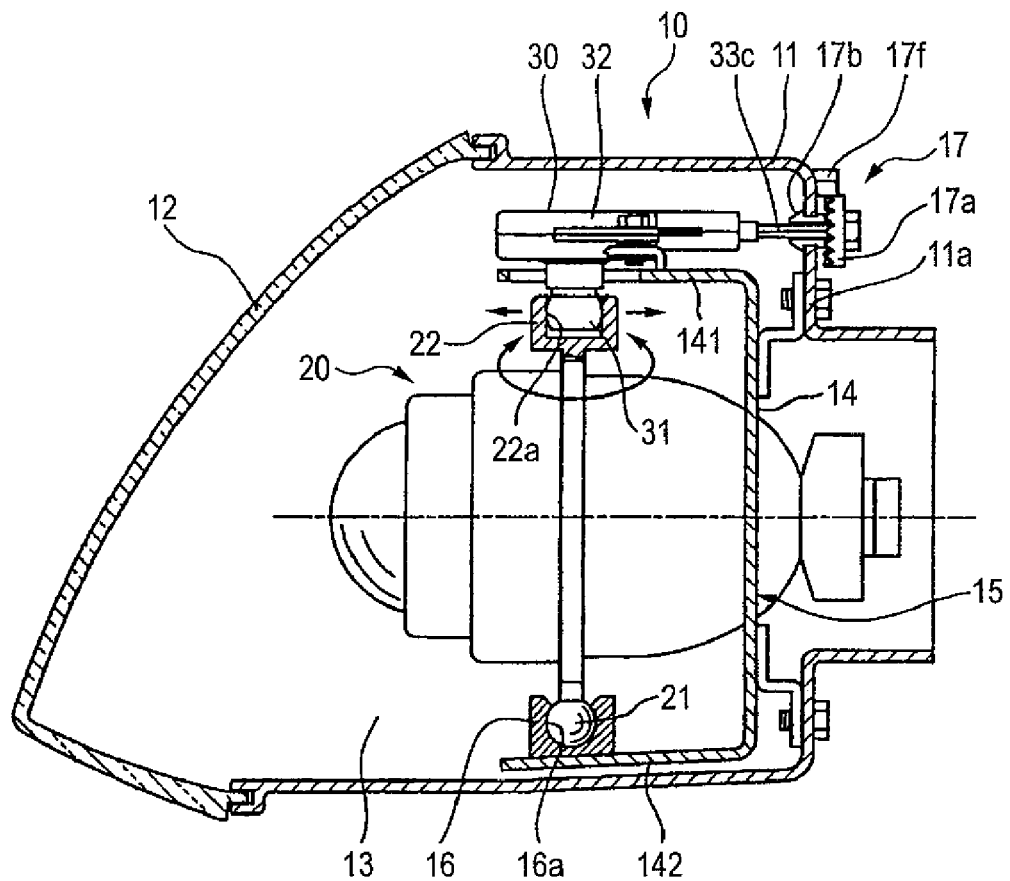
FIG. 1 is a schematic longitudinal sectional view of a vehicle headlamp according to an embodiment of the invention.

As shown in FIG. 1, a vehicle headlamp 10 includes a lamp body 11 having a front opening, a transparent cover 12, and a lamp unit 20 disposed inside a lamp chamber 13. The lamp chamber is formed by covering the front opening of the lamp body 11 with the transparent cover 12.

A bracket 14, which is to be fixedly assembled into the lamp body 11, is disposed inside the lamp chamber 13. The lamp unit 20, an aiming device 30 and the bracket 14 are assembled together in advance to constitute a subunit 15, and then the subunit 15 is fixed to the lamp body 11.

The bracket 14 includes an upper attaching piece 141 and a lower attaching piece 142 opposing each other. An actuator 30 (the aiming device) is fixed to the upper attaching piece 141, and a ball receiving member 16 is fixed to the lower attaching piece 142. The ball receiving member 16 is formed with a spherical concave portion 16a, which is open at an upper surface thereof.

The lamp unit 20 is configured to forwardly irradiate light having a predetermined light distribution pattern. A ball member 21 protrudes from a lower surface of the lamp unit 20, and is fitted in the spherical concave portion 16a of the ball receiving member 16, whereby a fulcrum of a ball joint type is provided. A rotation of the ball member 21 inside the spherical concave portion 16a of the ball receiving member 16 allows the lamp unit 20 to be tilted in vertical and horizontal directions. A joint member 22 protrudes from an upper surface of the lamp unit 20. The joint member 22 is formed with a coupling concave portion 22a, which is open at an upper surface thereof. An output shaft 31 of the actuator 30 is press fitted into the coupling concave portion 22a. The output shaft 31 of the actuator 30 is configured to be rotatable and longitudinally movable with respect to a case 32. When the output shaft 31 is rotated, the joint member 22 to which the output shaft 31 is coupled receives the rotating force of the output shaft 31 so that the lamp unit 20 provided with the joint member 22 is rotated in the horizontal direction. When the output shaft 31 is moved in the longitudinal direction (a front-and-rear direction), the joint member 22 is longitudinally moved, while the ball member 21 is fixed with respect to the longitudinal direction. Therefore, the lamp unit 20 is tilted in the vertical direction. As described above, the lamp unit 20 is tilted in the vertical and horizontal directions.

According to the above configuration, the fulcrum (the ball member 21 and the spherical concave portion 16a of the ball receiving member 16) and the aiming device 30 are attached to the bracket 14, which is fixedly assembled into the lamp body 11. Therefore, the fulcrum, the aiming device 30, and the bracket 14 can be unitized as the subunit 15 by assembling them together in advance. Thus, it is possible to enhance the assembly into a vehicle body and to standardize the apparatus.

Figure 3:
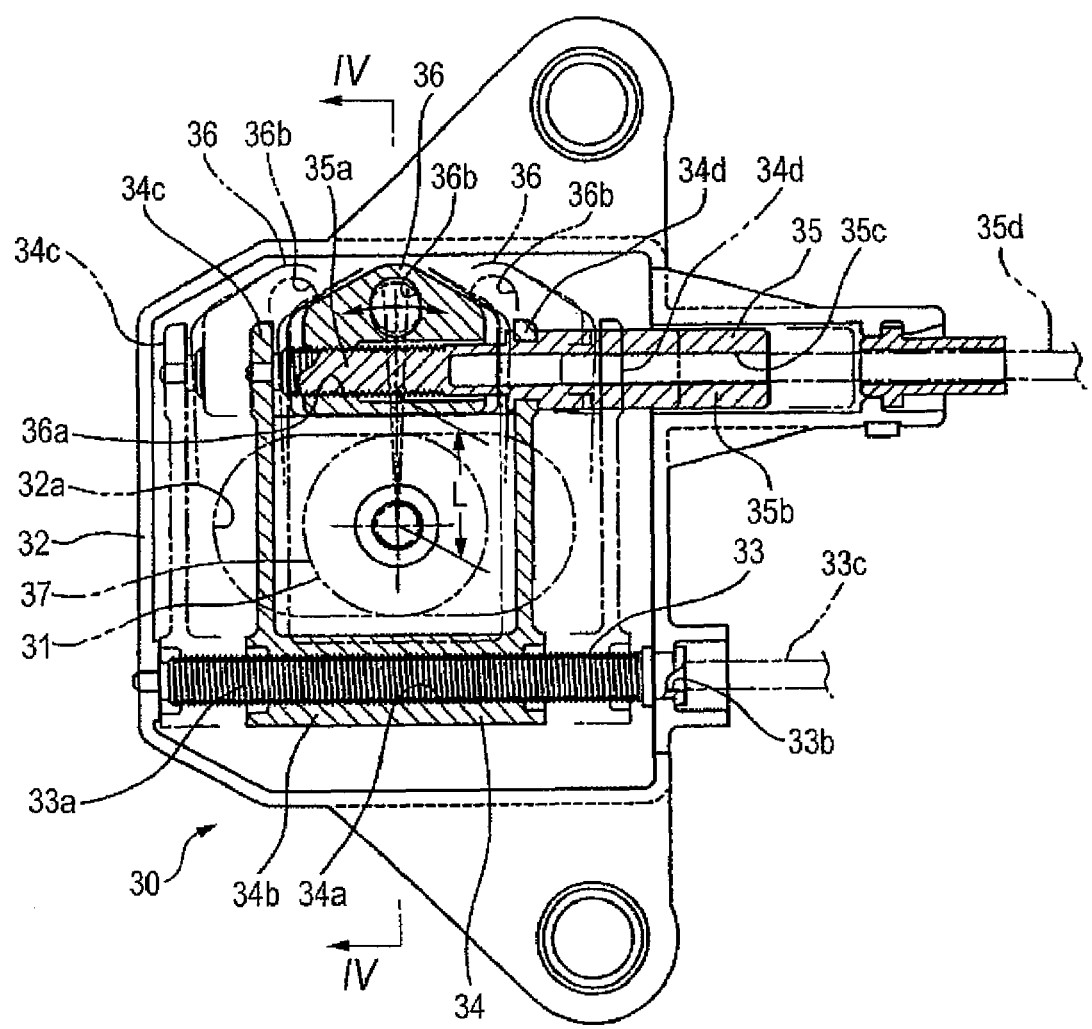
FIG. 3 is a partially cutaway bottom view showing an actuator (an aiming device).
Figure 4:
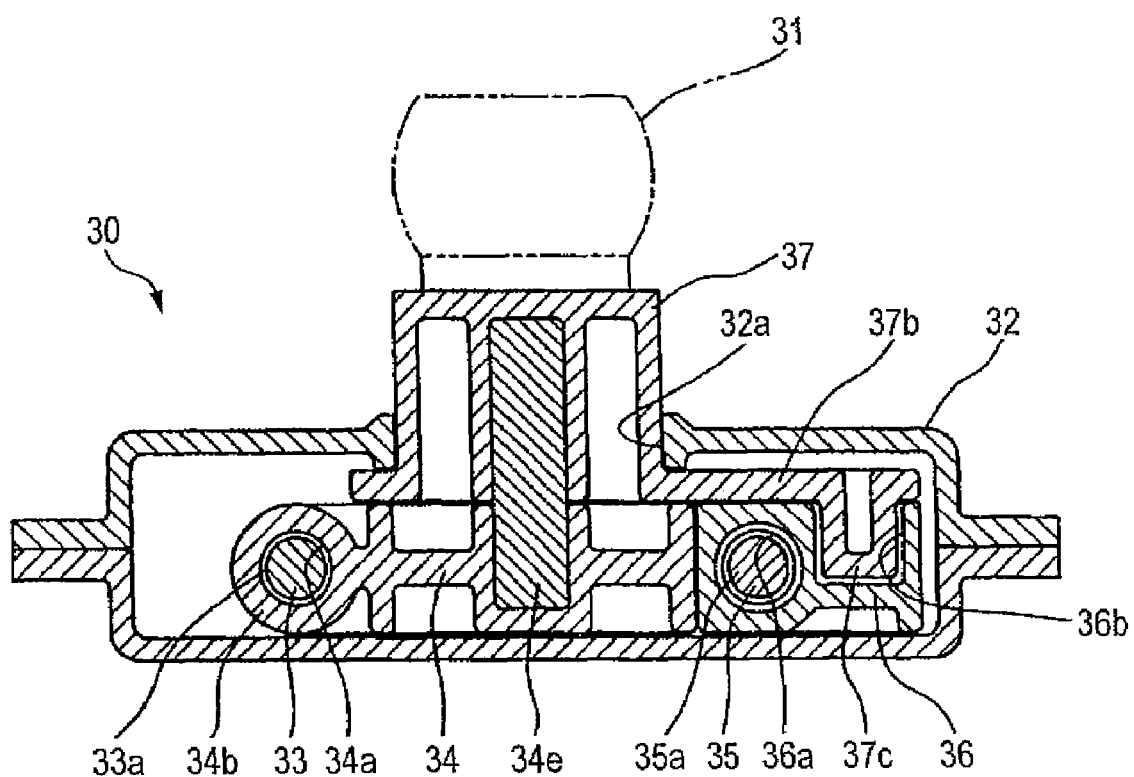
FIG. 4 is a sectional view taken along the line IV-IV in FIG. 3.
Figure 5:
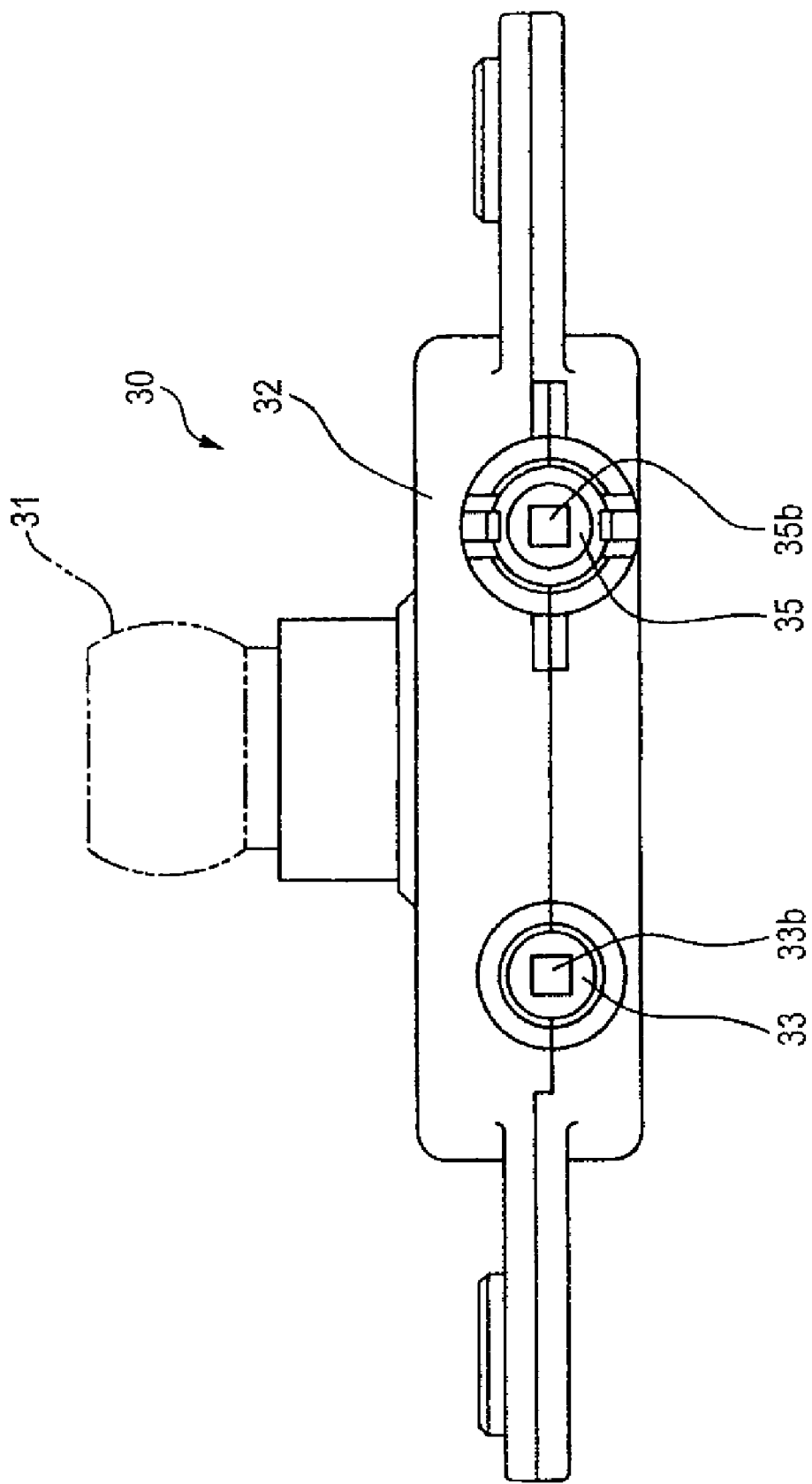
FIG. 5 is a rear view of the actuator.

Next the actuator 30 will be described in detail with reference to FIGS. 3 to 5.

A vertical aiming shaft 33 extending in the longitudinal direction is rotatably supported inside the case of the actuator 30 on one side (on a right side or on a left side). An outer surface of the vertical aiming shaft 33 is formed with a spiral thread 33. A rear end portion of the vertical aiming shaft 33 is formed with a coupling hole 33b, which is open at a central part of a rear end surface of the vertical aiming shaft 33. A cross section of the coupling hole 33b has a non-circular shape, e.g., a rectangular shape.

A slider 34 is supported on the vertical aiming shaft 33 such that the slider 34 is movable along the longitudinal direction. A screw hole 34a extending in the longitudinal direction is formed inside the slider 34, and a portion of the vertical aiming shaft 33 where the spiral thread 33a is formed is screwed into the screw hole 34a. When the vertical aiming shaft 33 is rotated, therefore, the spiral thread 33a sends a thread groove of the screw hole 34a of the slider 34. Consequently, the slider 34 is moved forward or backward depending a direction of a rotation of the vertical aiming shaft 33.

Support arms 34c, 34d protrude from both front and rear ends of a side portion 34b inside which the screw hole 34a of the slider 34 is formed toward the other side portion. A horizontal aiming shaft 35 is rotatably supported between tip portions of the support arms 34c, 34d, i.e., between ends on an opposite side of the side portion 34b. The horizontal aiming shaft 35 includes a screw shaft portion 35a positioned between the two support arms 34c, 34d, and a coupling portion 35b protruding rearward from the support arm 34d on a rear side. The screw shaft portion 35a and the coupling portion 35b are formed in a one-piece structure. An outer surface of the screw shaft portion 35a is formed with a spiral thread. The coupling portion 35b is formed with a coupling hole 35c, which is open at a rear end surface thereof. A cross section of the coupling hole 35c has a non-circular shape, e.g., a rectangular shape.

A horizontal aiming adjusting member 36 is disposed between the tip portions of the support arms 34c, 34d, and is moved in the longitudinal direction in accordance with a rotation of the horizontal aiming shaft 35. The horizontal aiming adjusting member 36 is formed with a screw hole 36a extending in the longitudinal direction, and the screw shaft portion 35a of the horizontal aiming shaft 35 is screwed into the screw hole 36a. When the horizontal aiming shaft 35 is rotated, therefore, the screw hole 36a of the horizontal aiming adjusting member 36 is sent forward or rearward by means of the screw shaft portion 35a. Therefore, the horizontal aiming adjusting member 36 is moved forward or rearward along the screw shaft portion 35a of the horizontal aiming shaft 35. The aiming adjusting member 36 is formed with a coupling hole 36b extending in a direction orthogonal to a direction along which the two aiming shafts 33, 35 are juxtaposed and also orthogonal to the longitudinal direction.

An output member 37 is supported on the slider 34. The output shaft 37 includes the output shaft 31 having a cylindrical shape, and an arm piece 37b protruding from an outer surface of the output shaft 31 in a direction orthogonal to an axial direction of the output shaft 31. The output shaft 31 and the arm piece 37b are formed in a one-piece structure. A tip portion of the arm piece 37b is provided with an engaging pin 37c protruding in the same direction as the axial direction of the output shaft 31. The output shaft 31 is rotatably supported on a support shaft 34e protruding from the slider 34. The engaging pin 37c is rotatably engaged with the coupling hole 36b of the horizontal aiming adjusting member 36.

A lower surface of the case 32 is formed with an insertion hole 32a extending in the longitudinal direction. The output shaft 31 is inserted through the insertion hole 32a of the case 32 and thus protrudes downward. The actuator 30 is attached to the upper attaching piece 141 of the bracket 14, and the output shaft 31 of the actuator 30 is press fitted into the coupling concave portion 22a of the joint member 22 provided on the lamp unit 20.

Flexible wires 33c, 35d are coupled to the vertical aiming shaft 33 and the horizontal aiming shaft 35, respectively. The vertical aiming shaft 33 and the horizontal aiming shaft 35 are rotated separately through the flexible wires 33c, 35d.

A tip portion of the flexible wire 33c has cross section of a rectangular shape. The rectangular tip portion of the flexible wire 33c is fitted into the coupling hole 33b of the vertical aiming shaft 33. When the flexible wire 33c is rotated by an external operation, the aiming shaft 33 is rotated so that the slider 34 is moved along the longitudinal direction. Accordingly, the output member 37 supported on the slider 34 is moved in the longitudinal direction. When the output member 37 is moved in the longitudinal direction, the joint member 22 inside which the output shaft 31 is fitted is moved in the longitudinal direction. Therefore, the lamp unit 20 is tilted in the vertical direction with the ball member 21 at the lower end portion being a rotating fulcrum portion. Accordingly, the irradiating direction is changed in the vertical direction.

A tip portion of the flexible wire 35d also has a cross section of a rectangular shape. The rectangular tip portion of the flexible wire 35d is fitted into the coupling hole 35c of the horizontal aiming shaft 35 such that the flexible wire 35d is slidable in the longitudinal direction. When the flexible wire 35d is rotated by an external operation, the horizontal aiming shaft 35 is rotated. When the horizontal aiming shaft 35 is rotated, the rotation is transmitted to the screw shaft portion 35a so that the horizontal aiming adjusting member 36 is moved an the longitudinal direction. Therefore, the engaging pin 37c of the output member 37, which is fitted into the coupling hole 36b of the horizontal aiming member 36, is moved almost along the longitudinal direction. When the engaging pin 37c is moved, a position of the output shaft 31 does not change in the longitudinal direction. Consequently, the output shaft 31 is rotated in accordance with the movement of the engaging pin 37c. When the output shaft 31 is rotated, the lamp unit 20 receives the rotating force through the joint member 22 inside which the output shaft 31 is fitted. Thus, the lamp unit 20 is tilted in the horizontal direction with the ball member 21 at the lower end portion being the rotating fulcrum portion. Accordingly, the irradiating direction is changed in the horizontal direction.

In accordance with the rotation of the output shaft 31, the engaging pin 37c moves along a circular arc line, i.e., the engaging pin 37c is shifted in a direction orthogonal to the direction along which the horizontal aiming adjusting member 36 moves. For this reason, it is preferable that the coupling hole 36b of the horizontal aiming adjusting member 36 where the engaging pin 37c is engaged be a slot which is slightly longer in a direction along which a line connecting the output shaft 31 and the horizontal aiming adjusting member 36 extends.

Aiming operating portions 17, 18 are provided in an upper part of a rear surface of the lamp body 11. When the aiming operating portions 17, 18 are operated, the flexible shafts 33c, 35d rotates. Because the two aiming operating portions 17, 18 have the same structure, description will be given for one aiming operating portion 17, and description of the other will be omitted by indicating the reference numeral of the corresponding portion in parentheses.

Figure 2:
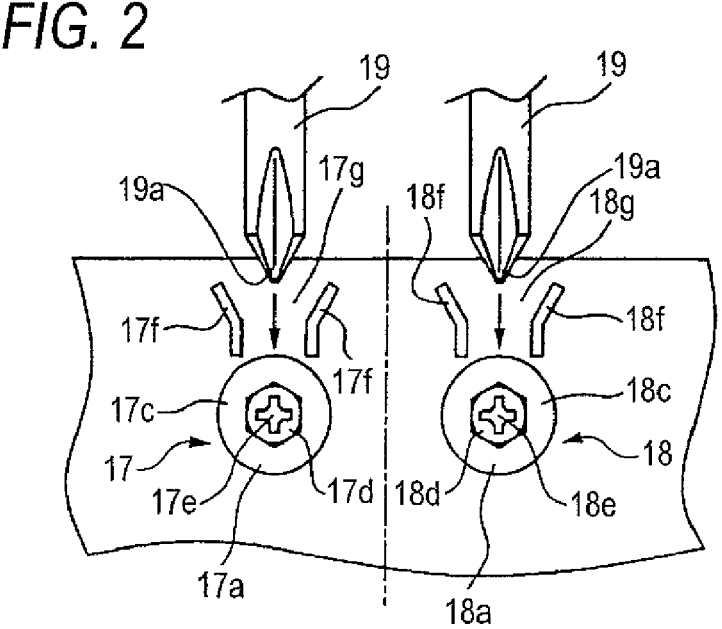
FIG. 2 is a view showing a part of a rear surface of the vehicle headlamp.

As shown in FIGS. 1 and 2, the aiming operating portion 17 (18) includes an aiming gear 17a (18a), which is rotatably supported on a rear wall 11a of the lamp body 11. The aiming gear 17a (18a) includes a shaft portion 17b (18b) supported on the rear wall 11a, a crown gear portion 17c (18c) provided on a rear side of the shaft portion 17b, and a head portion 17d (18d) provided on a rear side of the crown gear portion 17c (18c). The shaft portion 17b (18b), the crown gear portion 17c (18c), and the head portion 17d (18d) are formed in a one-piece structure. An external shape of the head portion 17d (18d) is hexagonal. The head portion 17d (18d) may be rotated, e.g., by means of a nut driver. Moreover, a cross groove 17e (18e) may formed on a rear face of the head portion 17d (18d) so that it can also be rotated by means of a plus driver. A guide path 17g (18g) is provided between two guide walls 17f (18f) at a position above a portion of a rear surface of the rear wall 11a of the lamp body 11 where the aiming gear 17a (18a) is supported. When a tip portion 19a of a plus driver 19 is inserted into the guide path 17g (18g) from above, the tip portion 19a engages with the crown gear portion 17c (18c). A rear end of the flexible wire 33c is fitted and fixed into the shaft portion 17b of the aiming gear 17a, and a rear end of the flexible wire 35d is fitted and fixed into a shaft portion (not shown) of the crown gear portion 18a.

Accordingly, when the crown gear portion 17c is rotated by the tip portion 19a of the plus driver 19 in the aiming operating portion 17, for example, the flexible wire 33c is rotated so that the vertical aiming shaft 33 is rotated by the flexible wire 33c. Thus, the lamp unit 20 is tilted in the vertical direction. When the crown gear portion 18c is rotated by the tip portion 19a of the plus driver 19 in the aiming operating portion 18, for example, the flexible wire 35d is rotated so that the horizontal aiming shaft 35 is rotated by the flexible wire 35d. Thus, the lamp unit 20 is tilted in the horizontal direction. When the actuator 30 is disposed in an upper area of the lamp chamber 13, it is possible to provide the aiming operating portions 17, 18 in upper side area of a vehicle body without increasing lengths of the flexible wires 33c, 33d. Therefore, a worker can easily reach the aiming operating portions 17, 18 from the upper side area of the vehicle body. Thus, the operability of aiming work can be enhanced.

According to the above configuration, vertical driving force transmitting means for transmitting a driving force from an outside of the lamp body to the vertical aiming means, and horizontal driving force transmitting means for transmitting a driving force from the outside of the lamp body to the horizontal driving force transmitting means are provided. Thus, the aiming device 30 can be arranged inside the lamp chamber 13 so that a space between the vehicle headlamp 10 and the vehicle body can be reduced.

Second Embodiment

Figure 6:
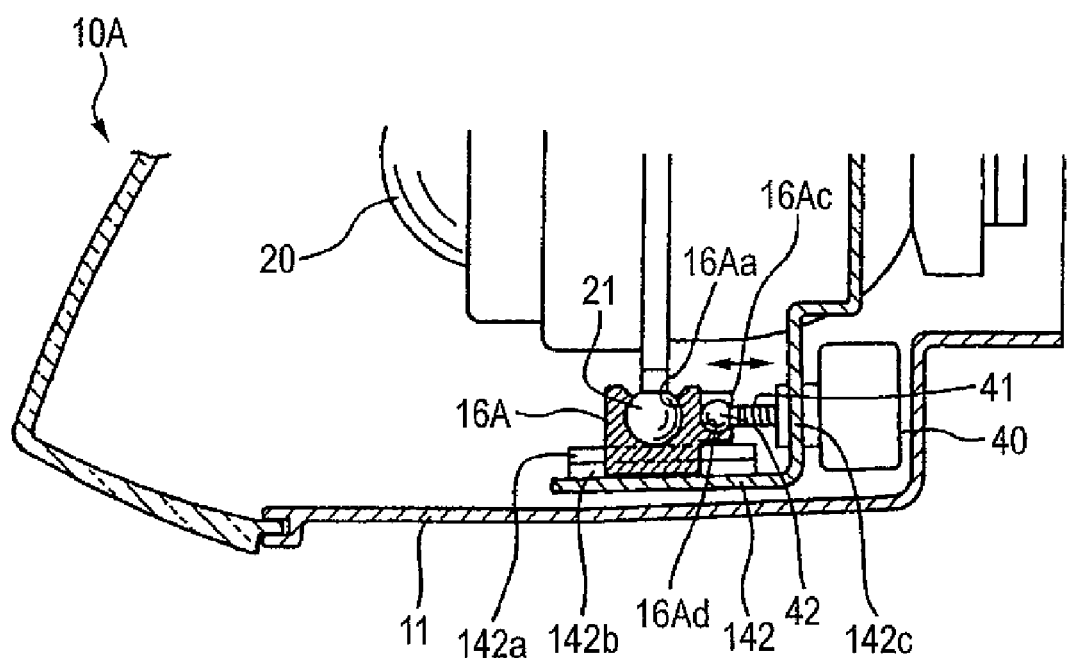
FIG. 6 is a schematic longitudinal sectional view showing a portion of a vehicle headlamp according to an embodiment.
Figure 7:
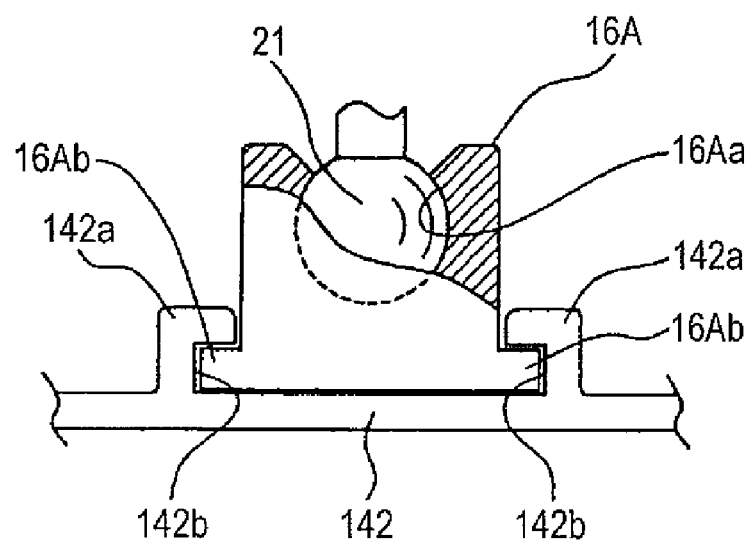
FIG. 7 is a partial front view of the vehicle headlamp shown in FIG. 6.

FIGS. 6 and 7 show a vehicle lamp 10A according to a second embodiment of the invention.

The vehicle headlamp 10A of the second embodiment is different from the vehicle headlamp 10 of the first embodiment in that it is possible to change the irradiating direction in the vertical direction while the vehicle is traveling (i.e., during a driving operation of the vehicle) by longitudinally moving a lower end portion of the lamp unit 20. Because the other features are similar to those of the vehicle headlamp 10, only the different features will be described in detail.

A ball receiving member 16A is disposed on an upper surface of the lower attaching piece 142 of the bracket 14, which is fixedly attached to the lamp body 11, such that the ball receiving member 16A is movable in the longitudinal direction. More specifically, as shown FIG. 7, rails 142a extending parallel with each other in the longitudinal direction are protruded from the upper surface of the lower attaching piece 142. Slide grooves 142b are formed on opposing surfaces of the rails 142a. The ball receiving member 16A includes engaging wing pieces 16Ab protruding in the horizontal direction. The engaging wing pieces 16Ab are slidably engaged with the slide grooves 142b of the rails 142a. Consequently, the ball receiving member 16A is supported on the lower attaching piece 142 so as to be movable in the longitudinal direction.

The ball receiving member 16A further includes a coupling portion 16Ac protruded from a rear surface thereof. The coupling portion 16Ac is formed with a spherical concave portion 16Ad opened at a rear surface thereof. The ball member 21 coupled to the lamp unit 20 is rotatably fitted inside a spherical concave portion 16Aa opened at an upper surface of the ball member receiving member 16A. Accordingly, the lower end portion of the lamp unit 20 is supported on the lower attaching piece 142 of the lamp body 11 so as to be movable in the longitudinal direction.

A leveling actuator 40 moves the ball receiving member 16A in the longitudinal direction. The leveling actuator 40 includes an operating shaft 41 and a ball member 42 formed on a front end of the operating shaft 41. The operating shaft 41 is moved in the longitudinal direction by a remote control, for example, by a manual operation carried out in a driver seat section, or by an automatic operation carried out in response to a detection signal from a sensor, which detects respective heights of front and rear axles to detect a tilt of a vehicle body. The leveling actuator 40 is fixed to a support portion 142c raised upward from a rear end of the lower attaching piece 142. The ball member 42 on the front end of the operating shaft 41 is rotatably fitted in the spherical concave portion 16Ad of the ball member receiving member 16A. When the leveling actuator 40 is driven so that the operating shaft 41 is moved in the longitudinal direction, the ball receiving member 16A is moved in the longitudinal direction. Consequently, the lamp unit 20 is tilted in the vertical direction while the joint member 22 coupled to the output portion of the actuator 30 serves as a rotating fulcrum.

According to the second embodiment, the fulcrum (the ball member 21 and the spherical concave portion 16Aa of the ball receiving member 16A) is supported so as to be movable in the longitudinal direction inside the lamp chamber 13, and the leveling actuator 40 is provided to move the fulcrum in the longitudinal direction in accordance with a remote control. Therefore, it is possible to provide both aiming adjustment means and leveling adjusting means. The aiming adjustment is an adjustment of the irradiating direction, which is carried out at time of factory shipments, during an automobile inspection, or after a repair. The leveling adjustment is an adjustment of the irradiating direction in the vertical direction, which is carried during a driving operation of a vehicle (i.e., when the vehicle is traveling) in order to correspond to a change of a load.

Third Embodiment

Figure 8:
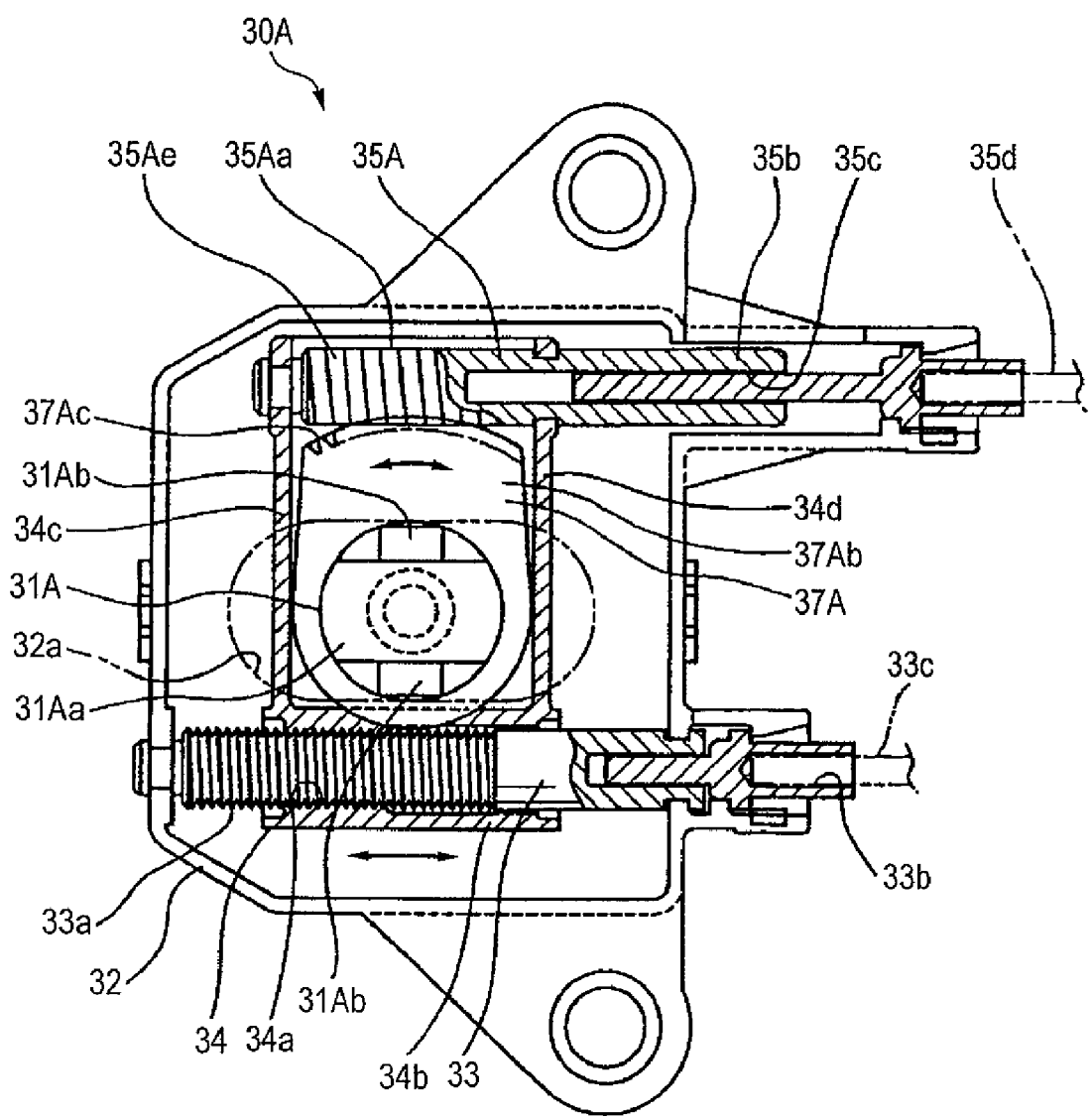
FIG. 8 is a partially cutaway bottom view showing an embodiment.

FIG. 8 shows an actuator 30A according to a third embodiment of the invention.

The actuator 30A is different from the actuator 30 of the first embodiment in that a horizontal aiming shaft 35A and an output shaft 31A is coupled in a different manner. The other features are the same as the first embodiment. Thus, only the different features will be described in detail, and description of the other similar features will be omitted.

In the actuator 30A a horizontal aiming adjusting member is not provided between the horizontal aiming shaft 35A and an output member 37A.

The output member 37A includes the output shaft 31A and an arm piece 37Ab protruding from an outer peripheral portion of the output shaft 31A The output shaft 31A and the arm piece 37Ab are integrally formed. An end face of the arm piece 37Ab which is distant from the output shaft 31A is formed in a shape of a circular arc having its center at a shaft center of the output shaft 31A. The circular arc end face of the arm piece 37Ab is formed with a gear tooth of a bevel gear, and serves as a wheel gear 37Ac. An outer surface of a tip side half of a portion 35Aa of the horizontal aiming shaft 35A, which is disposed between the support arms 34c, 34d of the slider 34 is formed with a gear tooth, and serves as a worm gear 35Ae. The worm gear 35Ae engages with the wheel gear 37Ac of the output member 37A. When the horizontal aiming shaft 35A is rotated through the flexible wire 35d, accordingly, the wheel gear 37Ac of the output member 37A is rotated by the worm gear 35Ae. Therefore, the output shaft 31A is rotated.

The output shaft 31A includes a first engaging portion 31Aa extending in a longitudinal direction, and second engaging portions 31Ab protruding from respective side surfaces of the first engaging portion 31Aa. Accordingly, a coupling concave portion of a joint member, into which the output shaft 31A is fitted, includes corresponding engaging concave portions in which the first engaging portion 31Aa and the second engaging portions 31Ab are engaged separately.

While description has been made in connection with embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A vehicle lamp comprising:
    a lamp body having a front opening;
    a transparent cover covering the front opening to form a lamp chamber;
    a lamp unit, which forwardly irradiates light, disposed inside the lamp chamber;
    an aiming device comprising an output shaft coupled to one of an upper surface and a lower surface of the lamp unit; and
    a fulcrum portion coupled to the other of the upper surface and the lower surface of the lamp unit,
    wherein the output shaft is movable in a front-and-rear direction with respect to the lamp body, and is rotatable around an axis extending in a vertical direction,
    wherein the fulcrum portion supports the lamp unit by a single fulcrum allowing the lamp unit to be tilted in the vertical direction and in a horizontal direction.

2. The vehicle lamp according to claim 1, wherein the aiming device is coupled to the upper surface of the lamp unit.

3. The vehicle lamp according to claim 1, further comprising a leveling actuator that moves the fulcrum portion in the front-and-rear direction with respect to the lamp body in accordance with a remote control.

4. The vehicle lamp according to claim 1, further comprising a bracket fixedly assembled into the lamp body, wherein the aiming device and the fulcrum shaft are attached to the bracket.

5. The vehicle lamp according to claim 1, wherein the aiming device further comprises:
    vertical aiming means for moving the output shaft in the front-and-rear direction; and
    horizontal aiming means for rotating the output shaft.

6. The vehicle lamp according to claim 5, further comprising:
    vertical driving force transmitting means for transmitting a driving force from an outside of the lamp body to the vertical aiming means; and
    horizontal driving force transmitting means for transmitting the driving force from the outside of the lamp body to the horizontal aiming means.

7. The vehicle lamp according to claim 1, wherein the fulcrum portion comprises:
    a ball member attached to the lamp unit; and
    a ball receiving member formed with a spherical concave portion,
    wherein the ball member is rotatably fitted inside the spherical concave portion.

8. The vehicle lamp according to claim 1, wherein the lamp unit is tilted in the vertical direction when the output shaft moves in the front-and-rear direction, and the lamp unit is tilted in the horizontal direction when the output shaft rotates.

9. The vehicle lamp according to claim 3, wherein the lamp unit is tilted in the vertical direction when the fulcrum portion is moved in the front-and-rear direction.

10. The vehicle lamp according to claim 4, wherein the bracket comprises:
    a rear plate extending in the vertical direction;
    an upper attaching piece extending in the front-and-rear direction from an upper end of the rear plate; and
    a lower attaching piece extending in the front-and-rear direction from a lower end of the rear plate,
    wherein the aiming device is fixed to one of the upper attaching piece and the lower attaching piece,
    wherein the fulcrum portion is coupled to the other of the upper attaching piece and the lower attaching piece.

11. The vehicle lamp according to claim 3, further comprising a sensor that detects respective heights of front and rear axles to detect a tilt of a vehicle body, wherein the remote control is an automatic operation carried out in response to a detection signal from the sensor.

* * * * *